United States Patent [19]

Mori et al.

[11] 4,421,804
[45] Dec. 20, 1983

[54] BOTTLE FOR CARBONATED DRINK

[75] Inventors: Fumio Mori, Yokohama; Junichi Itsubo; Hiroyuki Oda, both of Hiratsuka; Gunji Matsuda, Isehara, all of Japan

[73] Assignee: Japan Crown Cork Co., Ltd., Tokyo, Japan

[21] Appl. No.: 301,412

[22] Filed: Sep. 11, 1981

[51] Int. Cl.³ .............................................. B65D 23/00
[52] U.S. Cl. .................................. 428/35; 215/1 C; 426/127; 426/131; 426/398
[58] Field of Search .................. 215/1 C; 428/35; 426/127, 131, 398

[56] References Cited

U.S. PATENT DOCUMENTS

| 3,733,309 | 5/1973 | Wyeth et al. | 426/127 |
| 4,069,933 | 1/1978 | Newing | 215/1 C |
| 4,311,250 | 1/1982 | Ravve et al. | 426/131 |

Primary Examiner—William R. Dixon, Jr.
Attorney, Agent, or Firm—Sherman & Shalloway

[57] ABSTRACT

Disclosed is a bottle for a carbonated drink, which is formed by biaxial draw-blow molding of a polyester containing a surface active agent and being composed mainly of ethylene terephthalate units, wherein at least the barrel wall portion of the bottle is molecularly oriented biaxially so that the density is at least 1.34 g/cm³ as measured at 20° C., and the surface active agent is distributed in the surface of the barrel wall portion so that the contact angle of the surface of the barrel wall portion to water is not larger than 76°.

In this bottle, the speed of transfer of carbon dioxide gas from the liquid phase of the drink to the gas phase at the time of opening the bottle is controlled to a very low level. Accordingly, occurrence of the cap missile phenomenon at the time of removing the cap from the bottle or reduction of the carbon dioxide content in the drink at the time of repeating sealing and opening of the bottle can effectively be prevented.

12 Claims, 3 Drawing Figures

BOTTLE FOR CARBONATED DRINK

BACKGROUND OF THE INVENTION

(1) Field of the Invention

The present invention relates to an improvement in a carbonated drink bottle formed of a biaxially stretched polyester. More particularly, the present invention relates to a polyester bottle for a carbonated drink, in which the speed of transfer of carbon dioxide gas from the liquid phase of the drink to the gas phase at the time of opening the bottle is controlled to a very low level.

(2) Description of the Prior Art

A polyethylene terephthalate bottle formed by biaxial draw-blow molding has a much lighter weight than that of a glass bottle, and as described in the specification of U.S. Pat. No. 3,733,309, this bottle is excellent in the pressure resistance, rigidity and transparency and since the bottle has a much reduced permeability of gases such as oxygen and carbon dioxide gas, it is excellent in the content-preserving property. By virtue of these excellent properties, this polyester bottle is widely used as a vessel for preserving a carbonated drink.

Although this polyester bottle for a carbonated drink has the above-mentioned advantages not attained by ordinary glass bottles, it has recently been found that this polyester bottle has a certain defect not observed in glass bottles. More specifically, in a bottle product obtained by filling a carbonated drink into a polyester bottle and effecting sealing between the bottle and a cap, when the bottle is opened, carbon dioxide gas dissolved in the liquid phase of the drink is abruptly transferred to the gas phase and the cap being removed for opening is caused to fly out, that is, the so-called cap missile phenomenon takes place. In case of a bottled drink product having a large volume, a part of the packed drink is often taken out in small quantities and the bottle is sealed again by the cap. Also in this case, since carbon dioxide gas is transferred into the gas phase from the liquid phase of the drink at the time of opening, the concentration of carbon dioxide gas in the drink is drastically reduced to render the drink vapid and degrade the taste of the drink.

SUMMARY OF THE INVENTION

It is therefore a primary object of the present invention to provide a polyester bottle for a carbonated drink, in which the speed of transfer of carbon dioxide gas from the liquid phase of the drink to the gas phase at the time of opening of the bottle is controlled to a very low level.

Another object of the present invention is to provide a polyester bottle for a carbonated drink, in which occurrence of the above-mentioned cap missile phenomenon is prevented and drastic reduction of the concentration of carbon dioxide gas in the drink is prevented when the operation of pouring out the drink in small quantities and sealing the bottle with the cap is repeated.

Still another object of the present invention is to provide a polyester bottle for a carbonated drink, in which the above-mentioned defects of conventional polyester bottles are eliminated without impairing any of the excellent properties of conventional polyester bottles, such as high pressure resistance, high rigidity, high transparency and high gas barrier property.

In accordance with the present invention, there is provided a bottle for a carbonated drink, which is formed by biaxial draw-blow molding of a polyester containing a surface active agent and being composed mainly of ethylene terephthalate units, wherein at least the barrel wall portion of the bottle is molecularly oriented biaxially so that the density is at least 1.34 g/cm$^3$ as measured at 20° C., and the surface active agent is distributed in the surface of the barrel wall portion so that the contact angle of the surface of the barrel wall portion to water is not larger than 76°.

The present invention will now be described in detail with reference to the accompanying drawings.

DETAILED DESCRIPTION OF THE PREFERRED EMBODIMENTS

Figure 1:
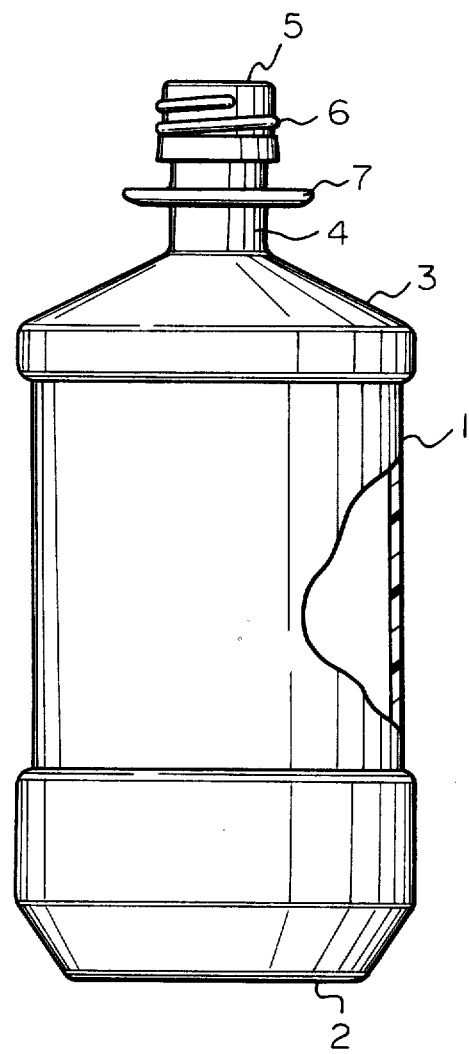
FIG. 1 is a partially sectional front view illustrating the entire structure of a carbonated drink bottle according to the present invention.

Referring to FIG. 1 illustrating the entire structure of the carbonated drink bottle according to the present invention, the bottle comprises a barrel wall portion 1 and a bottom wall portion 2 connected to the lower end of the barrel wall portion 1, and the two portions 1 and 2 are integrally formed from a polyester. A shoulder portion 3 having a frustoconical shape is formed on the upper end of the barrel wall portion 1 and a substantially cylindrical neck portion 4 is connected to the frustoconical shoulder portion 3. A screw 6 is formed on the neck portion 4 to support a lid member to be attached to a month 5 for sealing the bottle, such as a cap or crown closure (not shown), and a ring 7 is formed on the neck 4 to support the bottle at the step of packing a carbonated drink into the bottle or at the sealing step.

This pressure-resistant bottle is formed by biaxial draw-blow molding of a parison or preform of a polyester composed mainly of ethylene terephthalate units in a split mold having cavities conforming to the outer configuration of the bottle, and at least the polyester resin constituting the barrel wall portion is molecularly oriented biaxially, that is, in both the axial and circumferential directions of the bottle.

Figure 2:
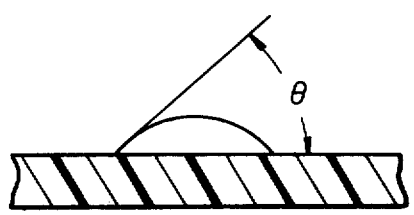
FIG. 2 is a sectional view showing the relation between a surface active agent-containing barrel wall portion of the bottle according to the present invention and a contact angle of the barrel wall portion to water.
Figure 3:
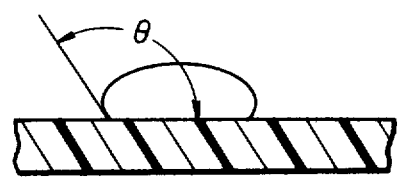
FIG. 3 is a sectional view showing the relation between a surface active agent-free barrel wall portion and a contact angle of the barrel wall portion to water.

One of the important characteristic features of the present invention is that a surface active agent is incorporated into a polyester constituting the bottle and the polyester is molecularly oriented biaxially so that the density of at least the barrel wall portion of the bottle is at least 1.34 g/cm$^3$ as measured at 20° C., and another important characteristic feature of the present invention is that the surface active agent is distributed in the surface of the barrel wall portion of the bottle so that the contact angle of the surface of the barrel wall portion to water is not larger than 76° as shown in FIG. 2. According to the present invention, by virtue of these characteristic features, the speed of transfer of carbon dioxide gas from the liquid phase of the drink to the gas phase at the time of opening a bottle filled with a carbonated drink is controlled to a level much lower than the transfer speed in conventional polyester bottles, with the result that occurrence of the above-mentioned undesirable and dangerous cap missile phenomenon and degradation of the taste and flavor of the drink by reduction of the carbon dioxide gas concentration can effectively be prevented.

The reason why the speed of transfer of carbon dioxide gas from the liquid phase of the drink to the gas phase at the time of opening is much higher in polyester bottles than in ordinary glass bottles has not precisely been elucidated. From the results of our researches, it is considered that one cause is that the wetting property of a polyester bottle to a carbonated drink is much lower than that of a glass bottle. We unexpectedly found that if the contact angle of the surface of at least a barrel wall portion of a polyester bottle to water is not larger than 76°, especially not larger than 72°, as measured at 23° C., the speed of transfer of carbon dioxide gas from the liquid phase of the drink to the gas phase is controlled to a level much lower than in a conventional polyester bottle.

In the present invention, in order to attain the foregoing objects, it is important that a surface active agent should be incorporated into a polyester to be formed into a bottle and the polyester should be molecularly oriented biaxially so that the density of at least the barrel wall portion of the bottle is at least 1.34 g/cm$^3$, especially 1.345 to 1.40 g/cm$^3$, as measured at 20° C. Ordinarily, when a heterogeneous component is incorporated into a plastic material to be molded, the heterogeneous component migrates to the surface portion of the resulting molded article. This phenomenon is well-known and called "blooming" or "migration". According to the present invention, by incorporating a surface active agent into a polyester and subjecting the side wall portion of a bottle formed of the surface active agent-incorporated polyester to specific molecular orientation, pressure resistance, rigidity, transparency and gas barrier property required for the barrel wall portion can be given to the barrel wall portion, and simultaneously, the surface active agent can be distributed in the surface of the barrel wall portion so that the contact angle of the surface of the barrel wall portion to water is adjusted within the above-mentioned range. It is believed that the reason is that increase of the density due to biaxial molecular orientation of the polyester may prominently promote blooming or migration of the surface active agent to the surface of the barrel wall portion.

From the viewpoint of preventing occurrence of the bubbling phenomenon, it is preferred that a surface active agent having a bubbling force of at least 10 mm, especially 50 to 250 mm, and a specific surface tension of less than 0.95, especially 0.30 to 0.75, as determined with respect to a solution having a concentration of 0.1% at a temperature of 25° C. according to the method of JIS K-3362, be used as the surface active agent. Non-ionic, anionic and amphoteric surface active agents having the above-mentioned properties are especially preferred for attaining the objects of the present invention.

Examples of surface active agents preferably used in the present invention are described below, though surface active agents that can be used in the present invention are not limited to those described below.

NON-IONIC SURFACE ACTIVE AGENTS

Glycerin fatty acid ($C_8$-$C_{22}$) esters, sorbitan fatty acid ($C_8$-$C_{22}$) esters, propylene glycol fatty acid esters, sucrose fatty acid esters, mono-, di - and tri-stearyl citrates, pentaerythritol fatty acid ($C_8$-$C_{18}$) esters, polyglycerin fatty acid ($C_8$-$C_{22}$) esters, polyoxyethylene (20) glycerin fatty acid ($C_{12}$-$C_{18}$) esters, polyoxyethylene (20) sorbitan fatty acid ($C_{12}$-$C_{18}$) esters, polyethylene glycol fatty acid ($C_8$-$C_{18}$) esters, polypropylene glycol fatty acid ($C_8$-$C_{18}$) esters, polyoxyethylene aliphatic alcohol ($C_{11}$-$C_{20}$) ethers, polyoxyethylene alkyl (having at least 7 carbon atoms) phenyl ethers, N,N'-bis(2-hydroxyethyl) aliphatic ($C_8$-$C_{18}$), condensation products of fatty acids ($C_{12}$-$C_{18}$) with diethanolamine, polyoxypropylene/polyoxyethylene block copolymers, polyethylene glycols (having a molecular weight higher than 200), and polypropylene glycols (having a molecular weight higher than 200).

ANIONIC SURFACE ACTIVE AGENTS

Alkyl ($C_{10}$-$C_{20}$) sulfonate salts (Na, K and NH$_4$), alkyl ($C_8$-$C_{20}$) benzene-sulfonate salts (Na, K and NH$_4$), alkyl naphthalene-sulfonate salts (Na), naphthaleneformaldehyde condensate sulfonate salts (Na), sodium alkyl ($C_{4-6}$, $C_8$, $C_{13}$) sulfosuccinates, alkyl ($C_8$-$C_{20}$) sulfate salts (Na, K and NH$_4$), polyoxyethylene aliphatic alcohol ($C_{12}$-$C_{20}$) ether sulfate salts (Na and NH$_4$), polyoxyethylene alkyl (having at least 7 carbon atoms) phenyl ether sulfate salts (Na and NH$_4$), natural fatty acid salts (Na, K and NH$_4$), rosin (disproportionated or hydrogenated) soaps (Na and K), styrene/maleic acid copolymers, and alkali metal salts of styrene/maleic acid copolymers.

CATIONIC SURFACE ACTIVE AGENTS

Dimethyl dialkyl ($C_{12}$-$C_{18}$) ammonium chlorides.

These surface active agents may be used singly or in the form of a mixture of two or more of them. If desired, these surface active agents may be used in combination with assistants or builders such as polyvinyl pyrrolidone, methyl cellulose, hydroxyethyl cellulose, hydroxymethyl cellulose, polyvinyl alcohol, carboxymethyl cellulose, a sodium salt thereof, polyacrylic acid, a sodium salt thereof, phosphoric acid salts (Na, K and Mg), and sodium tripolyphosphate.

As the surface active agent especially preferred for attaining the objects of the present invention, there can be mentioned a glycerin fatty acid mono-ester, a sorbitan fatty acid mono-ester, a propylene glycol fatty acid mono-ester, a polyoxyethylene glycerin fatty acid ester, a polyoxyethylene sorbitan fatty acid ester and a polyglycerin fatty acid ester.

Polyethylene terephthalate is preferably used as the polyester in the present invention. A copolyester comprising other comonomer in an amount not degrading characteristics of polyethylene terephthalate but ensuring attainment of the objects of the present invention, that is, in an amount of up to 5 mole %, may be used as the polyester in the present invention. As such comonomer, there can be mentioned, for example, dicarboxylic acid components such as isophthalic acid, p-β-hydroxyethoxybenzoic acid, naphthalene-2,6-dicarboxylic acid, diphenoxyethane-4,4'-dicarboxylic acid, 5-sodium-sulfoisophthalate, adipic acid, sebacic acid and alkyl ester derivatives of these dicarboxylic acids, and glycol components such as propylene glycol, 1,4-butanediol, neopentyl glycol, 1,6-hexylene glycol, cyclohexane dimethanol and a bisphenol A/ethylene oxide adduct.

Additives, for example, coloring agents such as pigments and dyes, ultraviolet absorbing agents and antistatic agents, may be added to the polyester.

From the viewpoint of the mechanical strength of a bottle formed by draw-blow molding, it is preferred that the intrinsic viscosity [μ] of polyethylene terephthalate used be at least 0.5, especially at least 0.6.

According to the present invention, the surface active agent is incorporated into the polyester in an amount of at least 10 ppm, preferably 100 to 5,000 ppm, based on the polyester.

The carbonated drink bottle of the present invention can be obtained according to the known draw-blow molding method except that the above-mentioned surface active agent incorporated polyester is used and the molding is conducted so that the degree of molecular orientation of the polyester constituting the barrel wall portion of the bottle is such that the density of the barrel wall portion is at least 1.34 g/cm$^3$.

According to one embodiment of the present invention, a parison of a polyester composed mainly of ethylene terephthalate units, in which a surface active agent has been incorporated, is heated at a drawing temperature, the heated parison is drawn in the axial direction of a bottle to be formed in a cavity of a mold defined by wall faces corresponding to the barrel wall portion and connected bottom wall portion of the bottle to be formed, and simultaneously or subsequently, a fluid is blown into the parison to expand and draw the parison in the circumferential direction of the bottle to be formed.

As the parison of the surface active agent-incorporated polyester, there can be used a bottomed parison formed by injection molding of a surface active agent-incorporated polyester and a bottomed parison formed by cutting a pipe obtained by extrusion molding of a surface active agent incorporated polyester into a predetermined length and closing one end of the cut piece by compression molding. From the viewpoints of the moldability and transparency, it is preferred that the parison to be used be rendered substantially amorphous by rapid cooling after molding.

The unit weight of the parison, i.e., the ratio of the weight (g) of the parison to the volume (cc) of the bottle, is ordinarily 0.01 to 0.08 g/cc and preferably 0.02 to 0.06 g/cc, though the unit weight of the parison is appropriately changed according to the desired degree of the pressure resistance.

The polyester parison is pre-heated at a drawing temperature prior to draw-blow molding. By the "drawing temperature" is meant a temperature which is lower than the crystallization temperature of the polyester used and which allows drawing of the polyester parison. More specifically, a temperature of 90° to 130° C., especially 90° to 110° C., is used as the drawing temperature.

Draw-blow molding of the pre-heated parison can be accomplished by known means such as subsequent draw-blow molding or simultaneous draw-blow molding. For example, there may be adopted a subsequent draw-blow molding method in which a parison is axially drawn (pre-blown) by blowing a fluid under a relatively low pressure and then, the parison is expanded and drawn in the circumferential direction by blowing a fluid under a relatively high pressure. Furthermore, there may be adopted a simultaneous draw-blow molding method in which a parison is drawn simultaneously in both the axial direction and the circumferential direction by blowing a fluid under a high pressure. Drawing of the parison in the axial direction can easily be accomplished, for example, by gripping the neck of the parison between a mold and a mandrel, placing a drawing rod on the inner face of the bottom of the parison and pulling the drawing rod.

In order to cause molecular orientation ensuring the density specified in the present invention, it is preferred that the draw ratios in the axial and circumferential directions of the parison be 1.5 to 2.5 (in the axial direction) and 1.7 to 4.0 (in the circumferential direction), respectively, at the above-mentioned drawing temperature.

As the carbonated drink that is filled in the bottle of the present invention, there can be mentioned, for example, carbonated refreshening drinks such as aerated drinks, lemon pops, cola drinks, plain soda drinks, ginger ale drinks, carbonated synthetic colored drinks, carbonated fruit juice drinks, carbonated vitamin drinks and carbonated amino acid-enriched drinks, and other carbonated drinks such as beer, bubbled fruit eines, high ball, gin fizz and other carbonated cocktails.

The present invention will now be described in detail with reference to the following Examples that by no means limit the scope of the invention.

EXAMPLE 1

To 100 parts by weight of polyethylene terephthalate having an intrinsic viscosity of about 0.96 was added 0.4 part by weight of a surface active agent shown in Table 1, and they were mixed homogeneously. The mixture was molded into a hollow cylindrical bottomed parison by injection molding and the parison was blow-molded into a cylindrical hollow blow bottle having an inner volume of 1020 ml and a weight of 55 g. For comparison, a bottle was similarly molded from polyethylene terephthalate free of a surface active agent. The molecular orientation was effected biaxially so that the density of the barrel wall portion of the resulting bottle was in the range of from 1.34 to 1.40 g/cm$^3$.

The contact angle of the barrel wall portion of each sample bottle to water was measured. Each bottle was filled with 1 l (head space=20 ml) or 750 ml (head space=270 ml) of a commercially available carbonated drink (Sprite) cooled to 5° C., and the bottle was sealed by an aluminum cap (Roll-on pilfer proof cap) having a diameter of 38 mm and allowed to stand at room temperature for 1 month.

The sample bottle was violently shaken for 2 minutes and then allowed to stand still for 10 minutes. Then, the cap was carefully removed and it was checked whether or not a force of flying-out of the cap being removed was given to the hand. The obtained results are shown in Table 2. From the results shown in Table 2, it is seen that the flying-out force of the cap being removed was much smaller in the bottle of the biaxially drawn, surface active agent-incorporated polyethylene terephthalate having a density of 1.35 g/cm$^3$ according to the present invention than in the comparative bottle of the biaxially drawn, surface active agent-free polyethylene terephthalate having a density of 1.337 g/cm$^3$.

TABLE 1

| Sample No. | Surface Active Agent |
| --- | --- |
| 1 | polyethylene glycol lauryl ether |
| 2 | stearic acid monoglyceride |
| 3 | sorbitan stearate |
| 4 | propylene glycol fatty acid ester |
| 5 | polyoxyethylene glycerin monostearate |
| 6 (comparison) | not added |

TABLE 2

| Sample No. | Surface Active Agent Kind | Amount (PHR) | Density (g/cm³) | Contact Angle (°) | Flying-out Force 1 l-Filled Bottle | Flying-out Force 750 ml-Filled Bottle |
|---|---|---|---|---|---|---|
| 1 | polyethylene glycol lauryl ether | 0.4 | 1.35 | 63 | no force | no force |
| 2 | stearic acid monoglyceride | 0.4 | 1.35 | 66 | no force | no force |
| 3 | sorbitan stearate | 0.4 | 1.35 | 67 | no force | no force |
| 4 | propylene glycol fatty acid ester | 0.4 | 1.35 | 66 | no force | no force |
| 5 | polyoxyethylene glycerin mono-stearate | 0.4 | 1.35 | 67 | no force | no force |
| 6 (comparison) | — | — | 1.337 | 79 | felt | considerable |

TABLE 3

| Sample No. | Surface Active Agent Kind | Amount (PHR) | Density (g/cm³) | Contact Angle (°) | Overflowing Amount (g) just after shaking | Overflowing Amount (g) after 2 minutes' standing | Loss Volume (vol.) |
|---|---|---|---|---|---|---|---|
| 1 | polyethylene glycol lauryl ether | 0.001 | 1.35 | 76 | 2.1 | 1.2 | 0.27 |
| 2 | polyethylene glycol lauryl ether | 0.01 | 1.35 | 72 | 0 | 0 | 0.11 |
| 3 | polyethylene glycol lauryl ether | 0.1 | 1.35 | 70 | 0 | 0 | 0.13 |
| 4 | polyethylene glycol lauryl ether | 0.2 | 1.35 | 69 | 0 | 0 | 0.16 |
| 5 | polyethylene glycol lauryl ether | 0.5 | 1.35 | 60 | 0 | 0 | 0.09 |
| 6 (comparison) | not added | 0 | 1.338 | 79 | 35.4 | 22.4 | 0.86 |

EXAMPLE 2

To 100 parts by weight of polyethylene terephthalate having an intrinsic viscosity of about 0.96 was added polyethylene glycol lauryl ether in an amount shown in Table 3 as the surface active agent. A bottle was molded from the mixture in the same manner as described in Example 1.

A commercially available aerated drink (3.2 Vol) was cooled to 5° C. and quietly filled in the bottle. The filled amount of the aerated drink was 1 liter (the head space being 20 ml). The bottle was sealed by an aluminum cap (Roll-on pilfer proof cap) having a diameter of 38 mm and allowed to stand still at room temperature for 3 months.

The bottle was violently shaken for 2 minutes, and the cap was removed just after shaking or after the bottle had been allowed to stand for 2 minutes after shaking, and the amount of the aerated drink overflowing from the mouth of the bottle was measured. The obtained results are shown in Table 3. It was found that when the surface active agent was not added or the amount added of the surface active agent was small, the aerated drink overflowed from the mouth of the bottle.

Separately, the sample bottle was similarly shaken, allowed to stand still for 2 minutes and the cap was removed. After 5 minutes, the bottle was capped again and the loss volume was measured. The obtained results are shown in Table 3. It was found that when the amount added of the surface active agent was in the range of 10 to 5,000 ppm, the value of the low volume was very small.

EXAMPLE 3

To 100 parts by weight of polyethylene terephthalate having an intrinsic viscosity of about 0.96 was added 0.3 part by weight of a surface active agent shown in Table 1, and they were homogeneously mixed and the mixture was formed into a bottle in the same manner as described in Example 1. The barrel wall portion of the bottle to be formed was molecularly oriented biaxially so that the density of the barrel wall portion was in the range of 1.34 to 1.40 g/cm³.

Cola as the commercially available carbonated drink was cooled to 5° C., and 750 ml of the cola was filled in the sample bottle (the head space being 270 ml), sealed by an aluminum cap having a diameter of 38 mm and allowed to stand still at room temperature for 1 month.

The sample bottle was gently shaken once or twice, and after 1 minute, the bottle was opened. After 5 minutes' standing, the bottle was capped again. In this manner, opening and capping was performed once a day, and this procedure was repeated for 3 days in sequence. The loss volume was measured by a master volume gauge. The obtained results are shown in Table 4.

It was found that although carbon dioxide gas in the carbonated drink escaped from the bottle while it was opened, when the surface active agent was incorporated into the starting polyethylene terephthalate and the surface of the bottle was thereby rendered easily wettable, escape of carbon dioxide gas was controlled and the loss volume was reduced.

TABLE 4

| Sample No. | Surface Active Agent Kind | Amount (PHR) | Density (g/cm³) | Contact Angle (°) | Loss Volume (vol.) |
|---|---|---|---|---|---|
| 1 | polyethylene glycol lauryl ether | 0.3 | 1.35 | 66 | 0.11 |
| 2 | stearic acid monoglyceride | 0.3 | 1.35 | 67 | 0.13 |
| 3 | sorbitan stearate | 0.3 | 1.35 | 69 | 0.09 |
| 4 | polyoxyethylene glycerin monostearate | 0.3 | 1.35 | 68 | 0.12 |
| 5 | propylene glycol fatty acid ester | 0.3 | 1.35 | 69 | 0.10 |
| 6 (comparison) | not added | — | 1.337 | 79 | 1.25 |

What is claimed is:

1. A bottle for a carbonated drink, which is formed by biaxial draw-blow molding of a polyester containing a surface active agent and being composed mainly of ethylene terephthalate units, wherein at least the barrel wall portion of the bottle is molecularly oriented biaxially so that the density is from 1.34 to 1.40 g/cm³ as measured at 20° C., and the surface active agent is distributed in the surface of the barrel wall portion so that the contact angle of the surface of the barrel wall portion to water is not larger than 76°, the surface active agent being incorporated in an amount of at least 10 ppm based on the polyester.

2. A bottle as set forth in claim 1, wherein the surface active agent is incorporated in an amount of 100 to 5000 ppm based on the polyester.

3. A bottle as set forth in claim 1, wherein the surface active agent is a non-ionic or anionic surface active agent.

4. A bottle as set forth in claim 1, wherein the surface active agent is a non-ionic or anionic surface active agent having a bubbling force of at least 10 mm and a specific surface tension of less than 0.95, as determined with respect to a solution having a sample concentration of 0.1% at a test temperature of 25° C., according to the method of JIS K-3362.

5. A bottle as set forth in claim 1, wherein the surface active agent is incorporated in an amount of 100 to 5,000 ppm based on the polyester.

6. A bottle as set forth in claim 1, wherein the surface active agent is a glycerin fatty acid ester.

7. A bottle as set forth in claim 1, wherein the surface active agent is a sorbitan fatty acid ester.

8. A bottle as set forth in claim 1, wherein the surface active agent is a propylene glycol fatty acid ester.

9. A bottle as set forth in claim 1, wherein the surface active agent is a polyoxyethylene glycerin fatty acid ester or polyoxyethylene sorbitan fatty acid ester.

10. A bottle as set forth in claim 1, wherein the surface active agent is a polyglycerin fatty acid ester.

11. A bottle as set forth in claim 1, wherein the barrel wall portion is molecularly oriented so that the density of the barrel wall portion is 1.345 to 1.40 g/cm³.

12. A bottle as set forth in claim 1, wherein the ratio of the weight of the parison to the volume of the bottle is in the range of from 0.01 to 0.08 g/cc.

* * * * *